(12) United States Patent
Luchner

(10) Patent No.: US 6,725,166 B1
(45) Date of Patent: Apr. 20, 2004

(54) FLOW PICKUP CIRCUIT

(75) Inventor: Stefan Luchner, München (DE)

(73) Assignee: MKS Instruments, Inc., Andover, MA (US)

( * ) Notice: Subject to any disclaimer, the term of this patent is extended or adjusted under 35 U.S.C. 154(b) by 19 days.

(21) Appl. No.: 10/256,917

(22) Filed: Sep. 27, 2002

(51) Int. Cl.$^7$ .............................................. G06F 19/00
(52) U.S. Cl. .................. 702/45; 73/204.25; 73/204.22; 73/202.5
(58) Field of Search ......................... 702/45; 73/204.25, 73/204.22, 202.5, 202

(56) References Cited

U.S. PATENT DOCUMENTS 5,708,214 A  *  1/1998  Kiguchi .................. 73/861.22

* cited by examiner

Primary Examiner—John Barlow
Assistant Examiner—Stephen J. Cherry
(74) Attorney, Agent, or Firm—McDermott, Will & Emery

(57) ABSTRACT

A flow pickup circuit for receiving a flow signal from a flow sensor and providing a flow indicator signal corresponding to flow characteristics through the flow sensor includes an inner bridge circuit, an outer bridge circuit, and a processor. The inner bridge circuit operates in a constant current mode, and produces a first sensing signal. The inner bridge circuit includes four components connected in a series loop, two of which include the flow sensor. The outer bridge circuit operates in a constant temperature mode, and produces a second sensing signal. The outer bridge circuit includes four components connected in a series loop, one of which includes the inner bridge circuit. The processor receives the first sensing signal and the second sensing signal, and produces the flow indicator signal therefrom. The processor subtracts an ambient temperature component from the second sensing signal to produce a constant temperature flow indicator.

20 Claims, 4 Drawing Sheets

FLOW PICKUP CIRCUIT

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to sensing circuitry, and more particularly to circuitry, associated with flow sensor, that provides significantly faster response times as compared to circuitry in similar prior art sensors.

There exists a demand for a mass flow controller (MFC) having a step response of less than 300 mS. The flow indicator signal of a flow sensor operating in a constant current supplied bridge circuit has been shown to exhibit a time constant of about 3 seconds, so that it takes more than 8 seconds for the signal to be appreciably close to its final value. The flow indicator signal of a flow sensor operating in a constant temperature (of sensor) configuration has been shown to be much faster (about 50 mS), but characteristics of the indicator signal are affected by the ambient temperature. In brief, a MFC operating in a constant current mode is stable, but slower than desired. A MFC operating in a constant temperature mode can provide the desired step response, but provides a signal that may be biased by the ambient temperature.

SUMMARY OF THE INVENTION

In one aspect of the present invention, a flow pickup circuit for receiving a flow signal from a flow sensor and providing a flow indicator signal corresponding to flow characteristics through the flow sensor comprises an inner bridge circuit, an outer bridge circuit, and a processor. The inner bridge circuit is constructed and arranged so as to operate in a constant current mode, and to produce a first sensing signal. One or more of the components of the inner bridge is the flow sensor. The outer bridge circuit is constructed and arranged so as to operate in a constant temperature mode, and to produce a second sensing signal. The inner bridge circuit is one of the components of the outer bridge circuit. The processor receives the first sensing signal and the second sensing signal, and produces the flow indicator signal therefrom.

In another embodiment, the inner bridge circuit includes four components connected in a series loop characterized by a first pair of diagonally-situated nodes and a second pair of diagonally-situated nodes. The first sensing signal includes a voltage potential between the first pair of diagonally-situated nodes.

In another embodiment, two of the four components include the flow sensor, disposed between the second pair of diagonally-situated nodes.

In another embodiment, the outer bridge circuit includes four components connected in a series loop characterized by a first pair of diagonally-situated nodes and a second pair of diagonally-situated nodes. The second sensing signal includes a voltage potential between the first pair of diagonally-situated nodes.

In another embodiment, one of the four components includes the inner bridge circuit, disposed between the second pair of diagonally-situated nodes.

In another embodiment, the processor multiplies the first sensing signal by the second sensing signal so as to produce a product, and divides the product by a workpoint current value so as to produce a constant current flow indicator.

In another embodiment, the processor subtracts an ambient temperature component from the second sensing signal, so as to produce a constant temperature flow indicator.

In another embodiment, the ambient temperature component is generated by subtracting the second sensing signal from the first sensing signal so as to produce a difference signal, then passing the difference signal through a low-pass filter. The low-pass filter may include an analog filter (i.e., for filtering analog signals) known in the art, or a digital filter (e.g., FIR, IIR, etc.) known in the art.

Another embodiment further includes at least one scaling module for scaling at least one of the first sensing signal and the second sensing, so that the first sensing signal and the second sensing signal have compatible magnitudes.

Another aspect of the invention comprises a method of receiving a flow signal from a flow sensor and providing a flow indicator signal corresponding to flow characteristics through the flow sensor. The method comprises producing a first sensing signal via an inner bridge circuit, constructed and arranged so as to operate in a constant current mode, wherein one or more of the components of the inner bridge is the flow sensor. The method further includes producing a second sensing circuit via an outer bridge circuit, constructed and arranged so as to operate in a constant temperature mode, wherein the inner bridge circuit is one of the components of the outer bridge circuit. The method further includes receiving the first sensing signal and the second sensing signal and producing the flow indicator signal therefrom.

Another embodiment further includes producing the first sensing signal via the inner bridge circuit that includes four components connected in a series loop characterized by a first pair of diagonally-situated nodes and a second pair of diagonally-situated nodes. The first sensing signal includes a voltage potential between the first pair of diagonally-situated nodes.

Another embodiment further includes producing the second sensing signal via the outer bridge circuit that includes four components connected in a series loop characterized by a first pair of diagonally-situated nodes and a second pair of diagonally-situated nodes. The second sensing signal includes a voltage potential between the first pair of diagonally-situated nodes.

Another embodiment further includes multiplying the first sensing signal by the second sensing signal so as to produce a product, and dividing the product by a workpoint current value so as to produce a constant current flow indicator.

Another embodiment further includes subtracting an ambient temperature component from the second sensing signal, so as to produce a constant temperature flow indicator.

Another embodiment further includes generating the ambient temperature component is generated by subtracting the second sensing signal from the first sensing signal so as to produce a difference signal, and passing the difference signal through a low-pass filter.

Another embodiment further includes scaling at least one of the first sensing signal and the second sensing via at least one scaling module, so that the first sensing signal and the second sensing signal have compatible magnitudes.

In another aspect, the invention comprises a flow pickup circuit for receiving a flow signal from a flow sensor and providing a flow indicator signal corresponding to flow characteristics through the flow sensor. The flow pickup circuit includes an inner bridge circuit constructed and arranged so as to operate in a constant current mode, and to produce a first sensing signal. The inner bridge circuit includes four components connected in a series loop, characterized by a first pair of diagonally-situated nodes and a second pair of diagonally-situated nodes. The first sensing signal is given by a voltage potential between the first pair of diagonally-situated nodes. Two of the four components include the flow sensor, disposed between the second pair of diagonally-situated nodes. The flow pickup circuit further includes an outer bridge circuit, constructed and arranged so as to operate in a constant temperature mode, and to produce a second sensing signal. The outer bridge circuit includes four components connected in a series loop, characterized by a first pair of diagonally-situated nodes and a second pair of diagonally-situated nodes. The second sensing signal is given by a voltage potential between the first pair of diagonally-situated nodes, wherein one of the four components includes the inner bridge circuit. The flow pickup circuit also includes a processor for receiving the first sensing signal and the second sensing signal, and producing the flow indicator signal therefrom. The processor subtracts an ambient temperature component from the second sensing signal, so as to produce a constant temperature flow indicator.

In another aspect, the invention comprises a flow pickup circuit for receiving a flow signal from a flow sensor and providing a flow indicator signal corresponding to flow characteristics through the flow sensor. The flow pickup circuit includes means for producing a first sensing signal. The means for producing a first sensing signal includes the flow sensor and operates in a constant current mode. The flow pickup circuit also includes means for producing a second sensing signal that includes four components connected in a series loop characterized by a first pair of diagonally-situated nodes and a second pair of diagonally-situated nodes. The second sensing signal includes a voltage potential between the first pair of diagonally-situated nodes, and one of the four components includes the inner bridge circuit. The flow pickup circuit also includes means for receiving the first sensing signal and the second sensing signal, and for subtracting an ambient temperature component from the second sensing signal, so as to produce a constant temperature flow indicator. The ambient temperature component is generated by subtracting the second sensing signal from the first sensing signal to produce a difference signal, and passing the difference signal through a low-pass filter.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
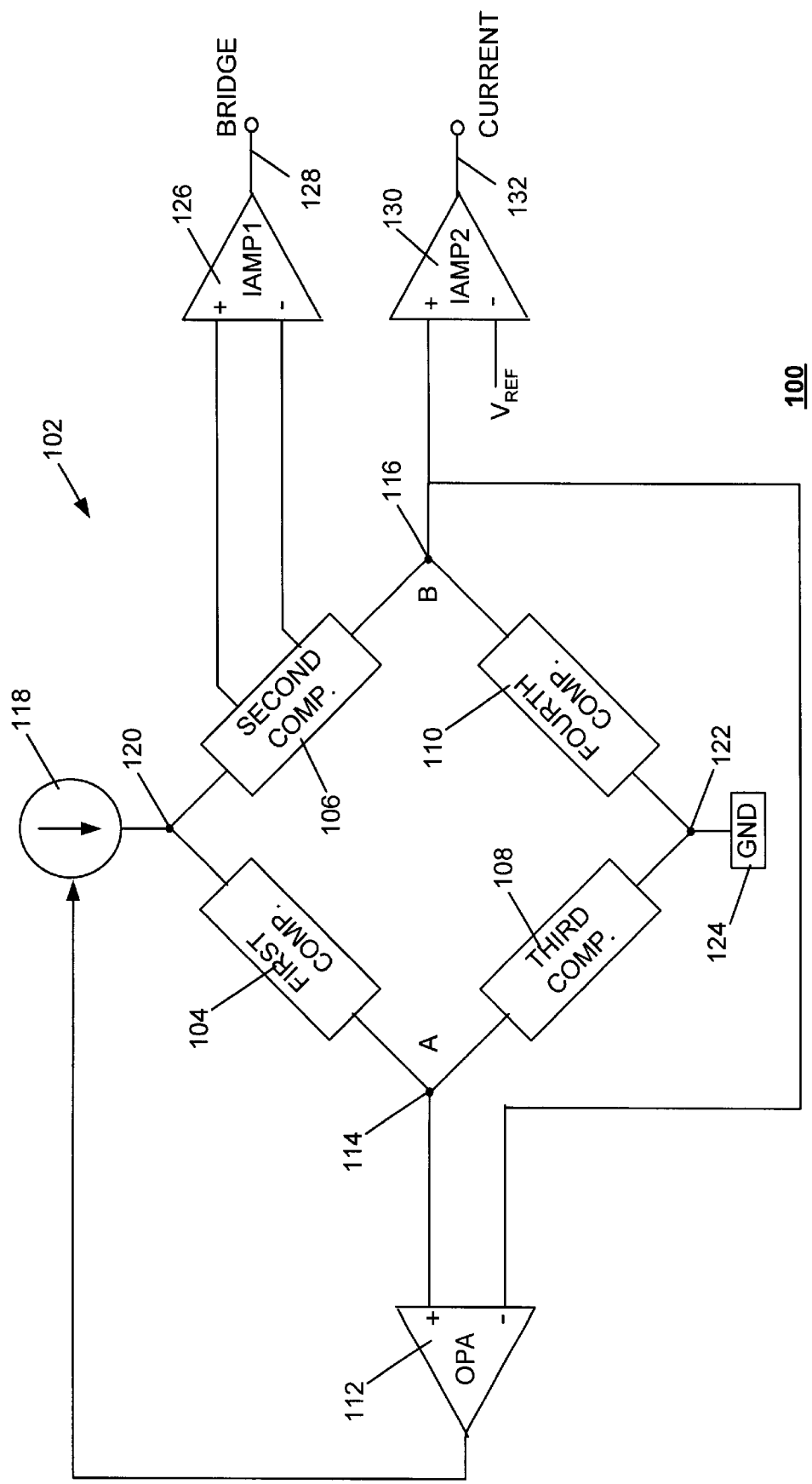
FIG. 1 shows a block diagram view of one embodiment of a flow pickup circuit according to the p sent invention.

One embodiment of the invention combines aspects of the constant current sensor mode and the constant temperature sensor mode in a single circuit, in order to benefit from the advantages of each individual mode (i.e., fast yet stable mass flow information). FIG. 1 shows a block diagram view of one embodiment of a flow pickup circuit 100 according to the present invention. The circuit 100 includes a bridge 102 that consists of a first bridge component 104, a second bridge component 106, a third bridge component 108, and a fourth bridge component 110, electrically coupled in a series loop as shown in FIG. 1. This diamond-shaped bridge architecture is well known in the art, and may be referred to as a "Wheatstone" bridge. The bridge 102 is thus characterized by a first pair of diagonally-situated nodes (node A 114 and node B 116), and a second pair of diagonally-situated nodes (top node 120 and bottom node 122). An operational amplifier 112 (or other similar comparative element known in the art) monitors the voltage potential $V_{AB}$ across node A 114 and node B 116, and controls the current source 118 so as to drive the voltage $V_{AB}$ to zero. The current source 118 provides current to the top node 120 of the bridge 102 as a function of the output signal from the amplifier 112. Current that passes through the bridge 102 sinks, via the bottom node 122, to a common ground 124. A first amplifier 126 receives two signals from within the second bridge component 106 and generates a first sensor signal BRIDGE 128 as a function of those two signals. A second amplifier 130 generates a second sensor signal CURRENT 132 as a function of the voltage at node B 116 and a reference voltage $V_{REF}$. In one preferred embodiment, the first amplifier 126 and the second amplifier 130 include instrumentation amplifiers, such as the INA2126E from BurrBrown (TI), but other similar difference amplifiers known in the art may also be used.

Figure 2:
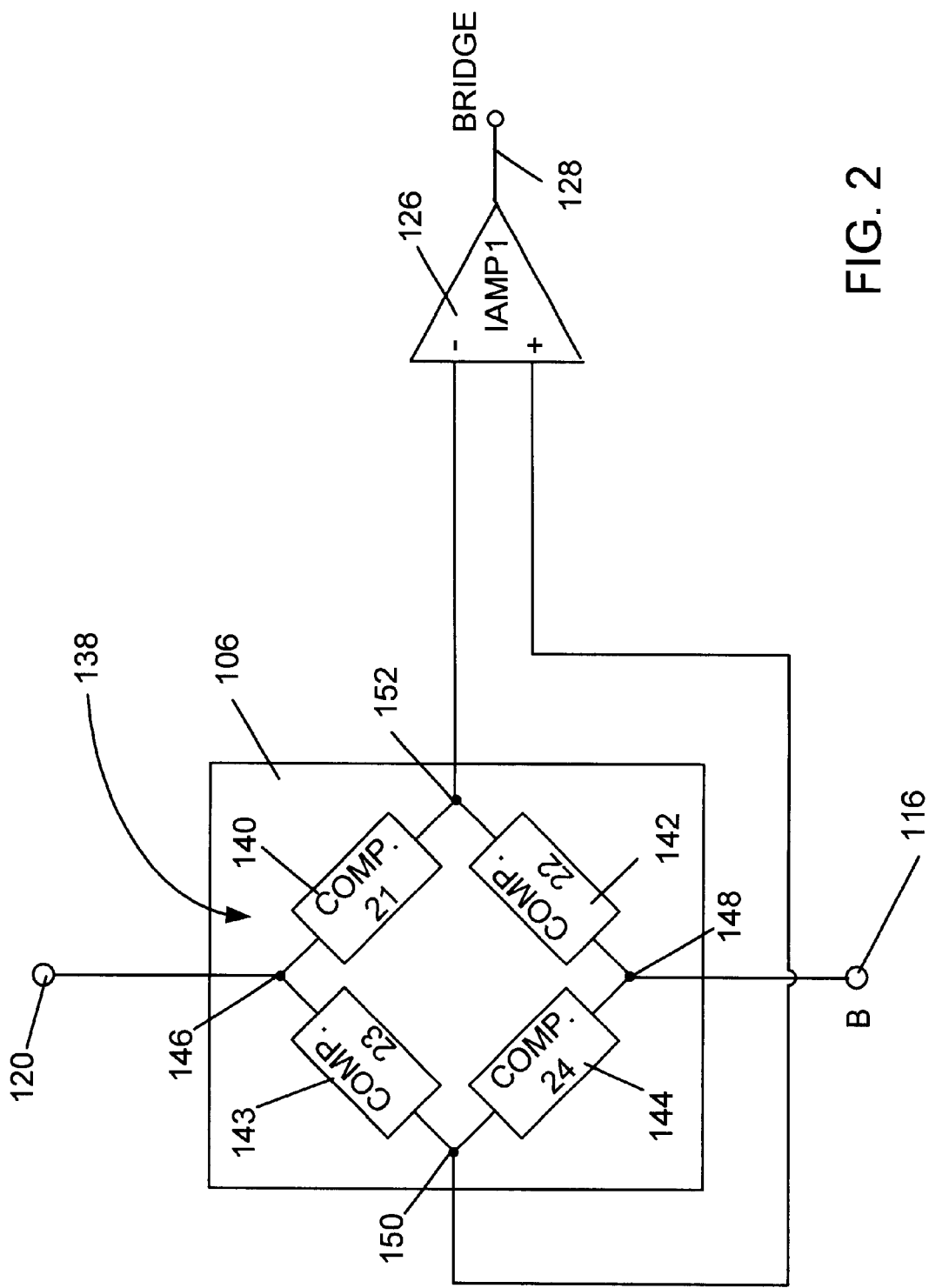
FIG. 2 shows the second element and the first amplifier of FIG. 1 in greater detail.

FIG. 2 shows the second element 106 in more detail, along with the first amplifier 126. The element 106 includes an inner bridge structure 138, consisting of a first inner element E21 140, a second inner element 142, a third inner element 144, and a fourth inner element 146, electrically coupled in the diamond-shaped bridge architecture shown in FIG. 2. The inner bridge 138 is characterized by a first pair of diagonally-situated nodes (node C 150 and node D 152), and a second pair of diagonally-situated nodes (top node 146 and bottom node 148). The top node 146 of the inner bridge 138 is electrically coupled to the top node 120, and the bottom node 148 is electrically coupled to node B 116. Node C 150 of the inner bridge 138 is electrically coupled to the inverting input of the first amplifier 126, and node D 152 is electrically coupled to the non-inverting input of the first amplifier 126.

Figure 3:
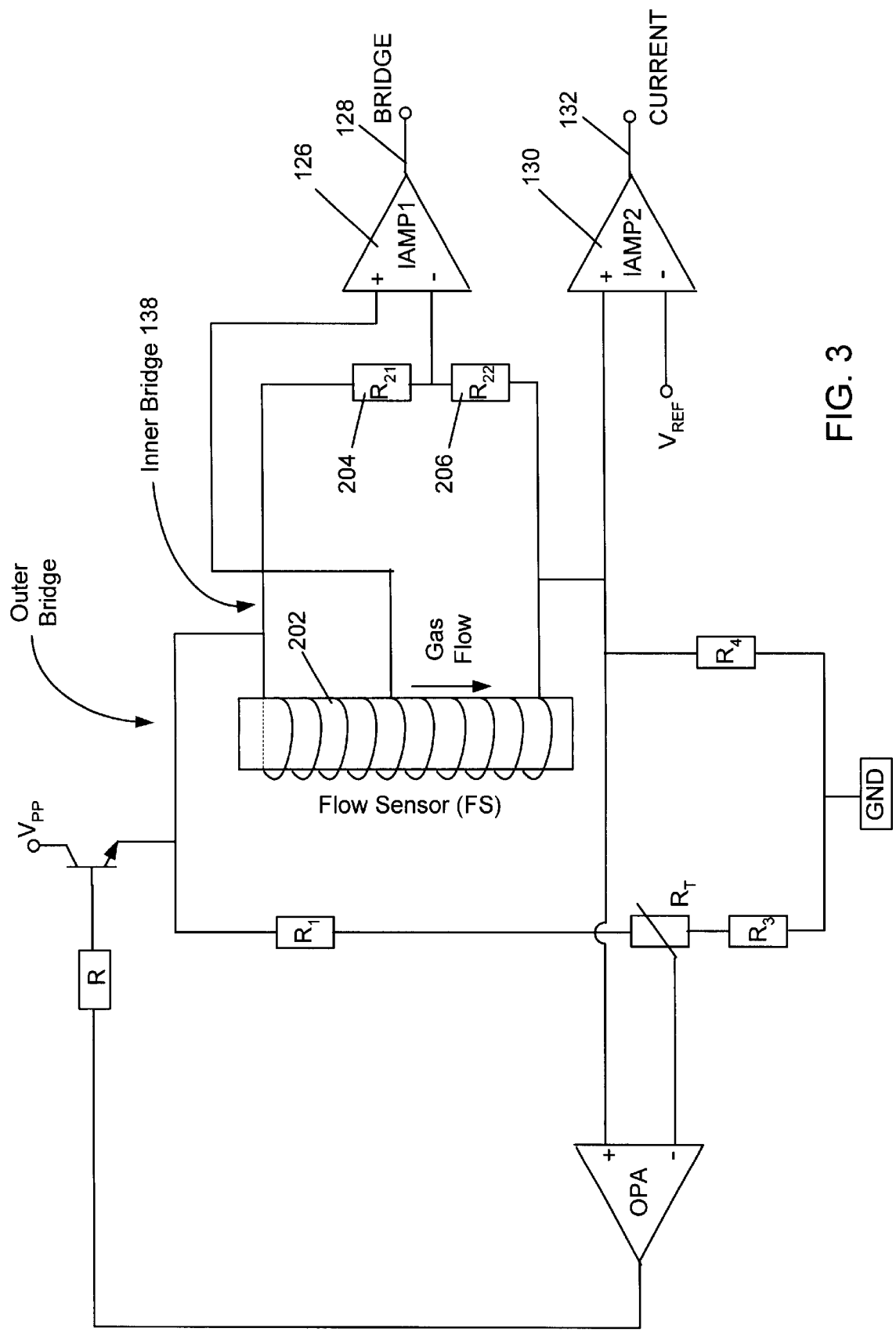
FIG. 3 shows, in schematic form, another embodiment of the flow pickup circuit of FIG. 1; and, FIG. 4 shows a signal flow diagram that may be used to implement an embodiment of the flow pickup circuit of FIG. 1.

FIG. 3 shows, in schematic form, another embodiment of a flow pickup circuit 200 according to the present invention. The flow sensor (FS) 202 and resistors R21 204 and R22 206 correspond to the inner bridge 138 that is shown within the second element 106 in FIG. 2. The resistor R21 204 corresponds to the first inner element 140 of the inner bridge 138, the resistor R22 corresponds to the second inner element 142 of the inner bridge 138, and the flow sensor 202 corresponds to a series of the third inner element 144 and the fourth inner element 146 of the inner bridge 138. The inner bridge 138 operates in a mode similar to what is typically known in the art as a "constant current mode." The inner bridge 138 is used as a sensor in a configuration that is typically known in the art as a "constant temperature mode." The inner bridge is a half bridge with inverse sensitive sensor, i.e., the sensor response is directly proportional to the bridge supply current. The sensor thus imparts a flow signal to the flow pickup circuit 200 via the inner bridge 138. The operational amplifier 112 controls the outer bridge so as to maintain a diagonal voltage (i.e., the voltage potential $V_{AB}$ across node A 114 and node B 116) of at or near zero volts, by varying the supply current for the inner bridge. Since the amount of supply current through the inner bridge 138 can be measured via the first amplifier 126, subsequent signal processing resources can use the measured inner bridge supply current to interpret the BRIDGE signal as a constant current mode flow signal. A flow indicator $F_{CC}$ may be formed as a function of the BRIDGE signal, the CURRENT signal, and the current at workpoint, as follows:

$$F_{CC}=(k)(\text{BRIDGE})(\text{CURRENT})/I_{WP} \quad (1)$$

Where $F_{CC}$=flow at constant current, $I_{WP}$=current at workpoint k=proportionality constant $F_{CC}$ will be a flow indicator as good as the signal of a constant current bridge.

Similarly, the outer bridge may be used to interpret the CURRENT signal as a constant temperature mode flow signal $F_{CT}$, as follows:

$$F_{CT}=(k)(\text{CURRENT}-I_{AT}) \quad (2)$$

The signal $F_{CT}$ includes the ambient temperature (AT), but assuming that the rate of change of the ambient temperature is much less than the rate of change of the measured flow, the ambient temperature component is approximately equal to the result of low-pass filtering the difference of the BRIDGE signal and the CURRENT signal, i.e., $$I_{AT} \sim LP[\text{CURRENT}-\text{BRIDGE}] \quad (3)$$

The low pass filter (LPF) represented by the symbol "LP[ ]" in equation (3) may include any signal filtering architecture known in the art, including digital and analog structures. The filter cutoff frequency and the rolloff characteristics may vary in different embodiments, depending upon the nature of the flow being measured. Note that when the flow is relatively constant, the low pass filter function LP[ ] passes the result of CURRENT−BRIDGE without substantial change (i.e., with little or no filtering), so that $$F_{CT}=(k)(\text{CURRENT}-[\text{CURRENT}-\text{BRIDGE}])=(k)(\text{BRIDGE}) \quad (4)$$

Equation (4) shows that when the flow is relatively constant, the flow signal $F_{CT}$ is proportional to the BRIDGE signal.

Figure 4:
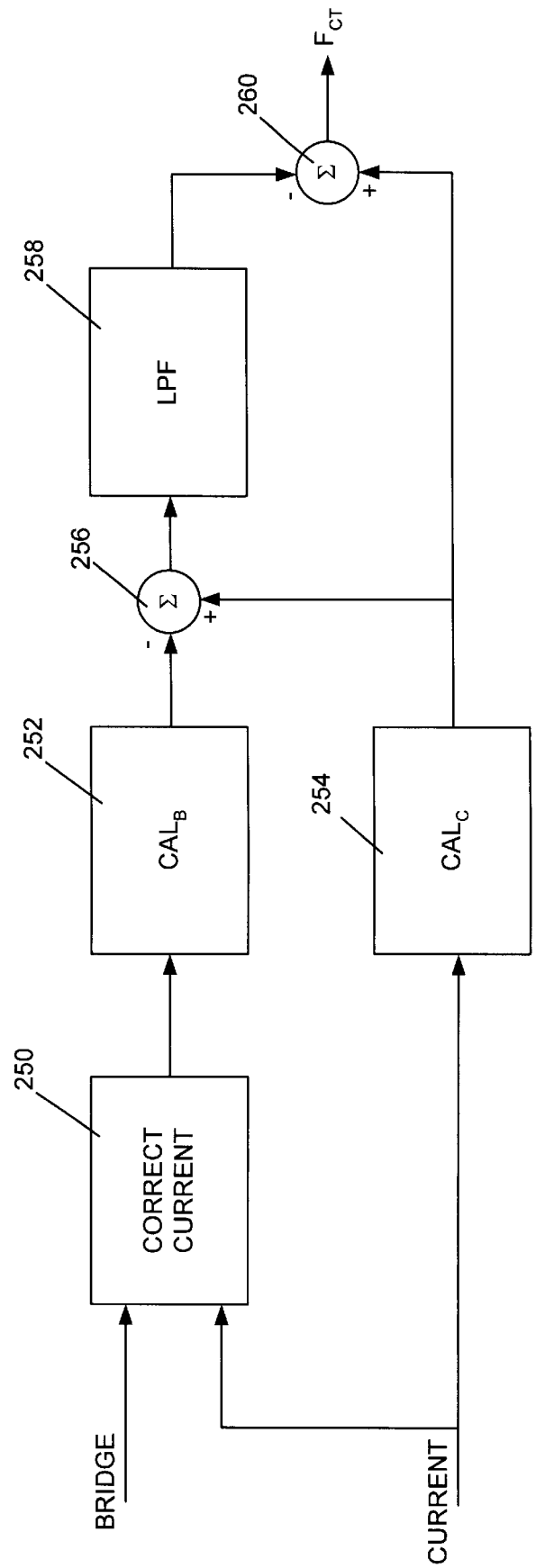

FIG. 4 shows a signal flow diagram that may be used to implement one embodiment of the present invention. The CORRECT CURRENT block 250 receives the BRIDGE signal and the CURRENT signal, and produces a corrected BRIDGE signal that is corrected according to the amount of supply current flowing though the inner bridge. The CALB block 252 and the CALC block 254 modify (i.e., scale) the BRIDGE and CURRENT signals, respectively, so that these two signals have similar magnitudes in terms of flow.

Similar magnitudes make the signals compatible for subsequent processing operations. In other embodiments, only one of the signals are scaled In operation, a flow pickup circuit constructed according to the signal flow of FIG. 4 scans the sensor over several flow samples (e.g., 10 samples in one embodiment) and equalize the corresponding values of BRIDGE and CURRENT according to the calibration tables within the CALB block 252 and the CALC block 254.

In one embodiment of the invention, non-linear implementations of the LPF 258 may be used to provide an output signal that is specifically tailored for a particular application. For example, one embodiment of the invention may include a non-linear filter that allows the output to follow the actual flow characteristics as long as the rate of change of the flow does not exceed a predetermined limit. When the flow rate of change exceeds this predetermined limit, the output is "frozen," i.e., held at the value of the output at the time the rate of change exceeded the limit. When the rate of change of the flow falls back below the predetermined limit, the nonlinear filter once again allows the output to follow the actual flow characteristics. A step in the output may occur when the output transitions from the "frozen" mode to the "flow following" mode, which may be smoothed by passing the output through a linear low pass filter following the non-linear filter.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A flow pickup circuit for receiving a flow signal from a flow sensor and providing a flow indicator signal corresponding to flow characteristics through the flow sensor, comprising:

an inner bridge circuit constructed and arranged so as to operate in a constant current mode, and to produce a first sensing signal, wherein one or more of the components of the inner bridge is the flow sensor;

an outer bridge circuit, constructed and arranged so as to operate in a constant temperature mode, and to produce a second sensing signal, wherein the inner bridge circuit is one of the components of the outer bridge circuit; and, a processor for receiving the first sensing signal and the second sensing signal and producing the flow indicator signal therefrom.

2. A flow pickup circuit according to claim 1, wherein the inner bridge circuit includes four components connected in a series loop characterized by a first pair of diagonally-situated nodes and a second pair of diagonally-situated nodes, and the first sensing signal includes a voltage potential between the first pair of diagonally-situated nodes.

3. A flow pickup circuit according to claim 2, wherein two of the four components include the flow sensor, disposed between the second pair of diagonally-situated nodes.

4. A flow pickup circuit according to claim 1, wherein the outer bridge circuit includes four components connected in a series loop characterized by a first pair of diagonally-situated nodes and a second pair of diagonally-situated nodes, and the second sensing signal includes a voltage potential between one node of the first pair of diagonally-situated nodes and a reference voltage.

5. A flow pickup circuit according to claim 4, wherein one of the four components includes the inner bridge circuit, disposed between the second pair of diagonally-situated nodes.

6. A flow pickup circuit according to claim 1, wherein the processor multiplies the first sensing signal by the second sensing signal so as to produce a product, and divides the product by a workpoint current value so as to produce a constant current flow indicator.

7. A flow pickup circuit according to claim 1, wherein the processor subtracts an ambient temperature component from the second sensing signal, so as to produce a constant temperature flow indicator.

8. A flow pickup circuit according to claim 7, wherein the ambient temperature component is generated by subtracting the second sensing signal from the first sensing signal so as to produce a difference signal, and passing the difference signal through a low-pass filter.

9. A flow pickup circuit according to claim 8, wherein the low-pass filter includes an analog filter.

10. A flow pickup circuit according to claim 8, wherein the low-pass filter includes a digital filter.

11. A flow pickup circuit according to claim 8, further including at least one scaling module for scaling at least one of the first sensing signal and the second sensing, so that the first sensing signal and the second sensing signal have compatible magnitudes.

12. A method of receiving a flow signal from a flow sensor and providing a flow indicator signal corresponding to flow characteristics through the flow sensor, comprising:
producing a first sensing signal via an inner bridge circuit, constructed and arranged so as to operate in a constant current mode, wherein one or more of the components of the inner bridge is the flow sensor;
producing a second sensing circuit via an outer bridge circuit, constructed and arranged so as to operate in a constant temperature mode, wherein the inner bridge circuit is one of the components of the outer bridge circuit; and,
receiving the first sensing signal and the second sensing signal and producing the flow indicator signal therefrom.

13. A method according to claim 12, further including producing the first sensing signal via the inner bridge circuit that includes four components connected in a series loop characterized by a first pair of diagonally-situated nodes and a second pair of diagonally-situated nodes, wherein the first sensing signal includes a voltage potential between the first pair of diagonally-situated nodes.

14. A flow pickup circuit according to claim 12, further including producing the second sensing signal via the outer bridge circuit that includes four components connected in a series loop characterized by a first pair of diagonally-situated nodes and a second pair of diagonally-situated nodes, wherein the second sensing signal includes a voltage potential between one node of the first pair of diagonally-situated nodes and a reference voltage.

15. A method according to claim 12, further including multiplying the first sensing signal by the second sensing signal so as to produce a product, and dividing the product by a workpoint current value so as to produce a constant current flow indicator.

16. A method according to claim 12, further including subtracting an ambient temperature component from the second sensing signal, so as to produce a constant temperature flow indicator.

17. A flow pickup circuit according to claim 16, further including generating the ambient temperature component is generated by subtracting the second sensing signal from the first sensing signal so as to produce a difference signal, and passing the difference signal through a low-pass filter.

18. A method according to claim 17, further including scaling at least one of the first sensing signal and the second sensing via at least one scaling module, so that the first sensing signal and the second sensing signal have compatible magnitudes.

19. A flow pickup circuit for receiving a flow signal from a flow sensor and providing a flow indicator signal corresponding to flow characteristics through the flow sensor, comprising:
an inner bridge circuit constructed and arranged so as to operate in a constant current mode, and to produce a first sensing signal, the inner bridge circuit including four components connected in a series loop characterized by a first pair of diagonally-situated nodes and a second pair of diagonally-situated nodes, and the first sensing signal includes a voltage potential between the first pair of diagonally-situated nodes, wherein two of the four components include the flow sensor, disposed between the second pair of diagonally-situated nodes;
an outer bridge circuit, constructed and arranged so as to operate in a constant temperature mode, and to produce a second sensing signal, the outer bridge circuit including four components connected in a series loop characterized by a first pair of diagonally-situated nodes and a second pair of diagonally-situated nodes, the second sensing signal including a voltage potential between the first pair of diagonally-situated nodes, wherein one of the four components includes the inner bridge circuit;
a processor for receiving the first sensing signal and the second sensing signal and producing the flow indicator signal therefrom, wherein the processor subtracts an ambient temperature component from the second sensing signal, so as to produce a constant temperature flow indicator.

20. A flow pickup circuit for receiving a flow signal from a flow sensor and providing a flow indicator signal corresponding to flow characteristics through the flow sensor, comprising:
means for producing a first sensing signal, wherein the means for producing a first sensing signal includes the flow sensor and operates in a constant current mode;
means for producing a second sensing signal, the outer bridge circuit including four components connected in a series loop characterized by a first pair of diagonally-situated nodes and a second pair of diagonally-situated nodes, the second sensing signal including a voltage potential between the first pair of diagonally-situated nodes, wherein one of the four components includes the inner bridge circuit;
means for receiving the first sensing signal and the second sensing signal, and for subtracting an ambient temperature component from the second sensing signal, so as to produce a constant temperature flow indicator, wherein the ambient temperature component is generated by subtracting the second sensing signal from the first sensing signal so as to produce a difference signal, and passing the difference signal through a low-pass filter.

* * * * *